Sept. 18, 1956 T. M. WARANCH Re. 24,221

SLIP COVER

Original Filed Nov. 25, 1952 2 Sheets-Sheet 1

INVENTOR
Theodore M. Waranch,

BY Karl W. Flocks
ATTORNEY

INVENTOR
Theodore M. Waranch,
BY Karl W. Flocks
ATTORNEY

United States Patent Office

Re. 24,221
Reissued Sept. 18, 1956

24,221

SLIP COVER

Theodore M. Waranch, Baltimore, Md.

Original No. 2,729,278, dated January 3, 1956, Serial No. 322,378, November 25, 1952. Application for reissue March 13, 1956, Serial No. 577,601

2 Claims. (Cl. 155—182)

The present invention relates to a slip cover for furniture. More particularly, the present invention relates to a ready-made slip cover for furniture that is adjustable to compensate for variations in the size and shape of the piece of furniture to be covered.

Ready-made slip covers are generally fabricated in many sizes to approximate the fit of stock pieces of furniture, such as upholstered chairs and sofas. Manufacturing costs are necessarily increased in producing these heretofore known slip covers since quantity production is not practicable unless the same slip cover is reproduced many times. The present invention is directed toward solving the problem of quantity producing slip covers of the type that can be adjusted to properly fit furniture of various shapes and sizes. By fabricating few models, but providing adjustments therefor, it is possible to quantity produce slip covers that not only will be economical for the consumer, but can be arranged to produce a satisfactory fit for any piece of furniture.

It is an object of the present invention to provide a ready-made slip cover that may be economically produced in large quantities.

Another object of the present invention is to provide a ready-made slip cover that is readily adjustable to fit furniture of various sizes and shapes.

Still another object of the present invention is to provide an adjustable slip cover that will snugly fit the chair or sofa to which it is applied.

Still another object of the present invention is to provide an adjustable slip cover which may be simply and quickly applied to the furniture to be covered.

Still another object of the present invention is to provide a ready-made slip cover wherein resilient members are provided which allow for the adjustment of the slip cover so that it snugly fits furniture of various sizes and shapes.

Other objects and the nature and advantages of the instant invention will be apparent from the following description taken in conjunction with the accompanying drawings, wherein.

The slip cover described herein is illustrated as being fitted on a conventional club chair. The seat cushion for the chair is removed, forming no part of the present invention. The slip cover is fabricated from individual panels of cloth having a desired print, the panels being suitably stitched together by production methods to form a unitary structure.

Figure 1:
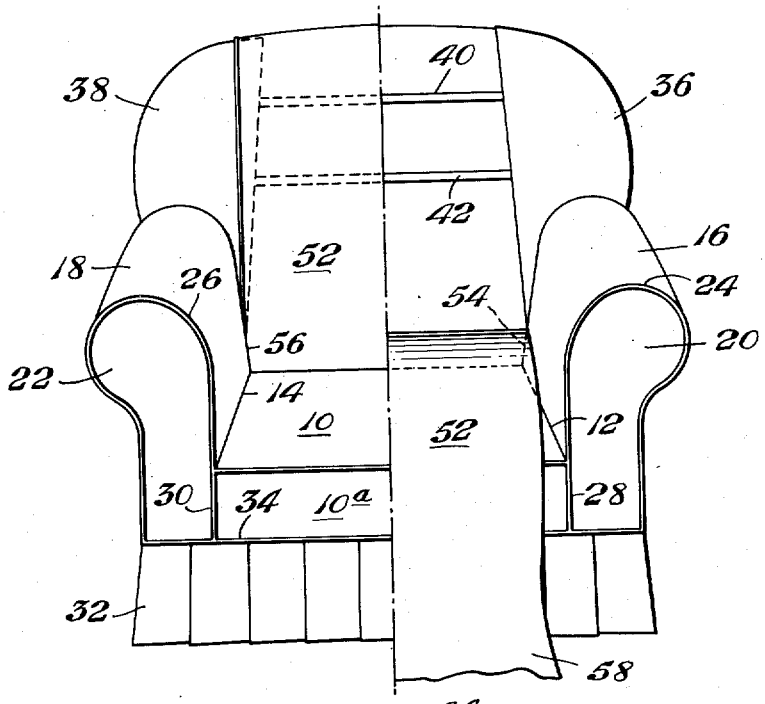
Fig. 1 is a front perspective view of one form of the slip cover embodied in the present invention, illustrating a portion of the closing flap in the open position.
Figure 2:
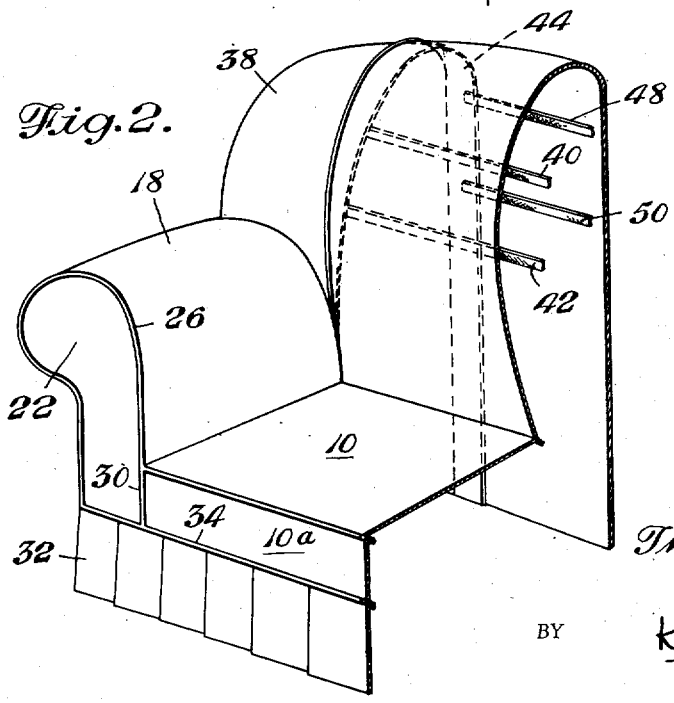
Fig. 2 is a side and front perspective view of the slip cover illustrated in Fig. 1, with parts shown in section.
Figure 3:
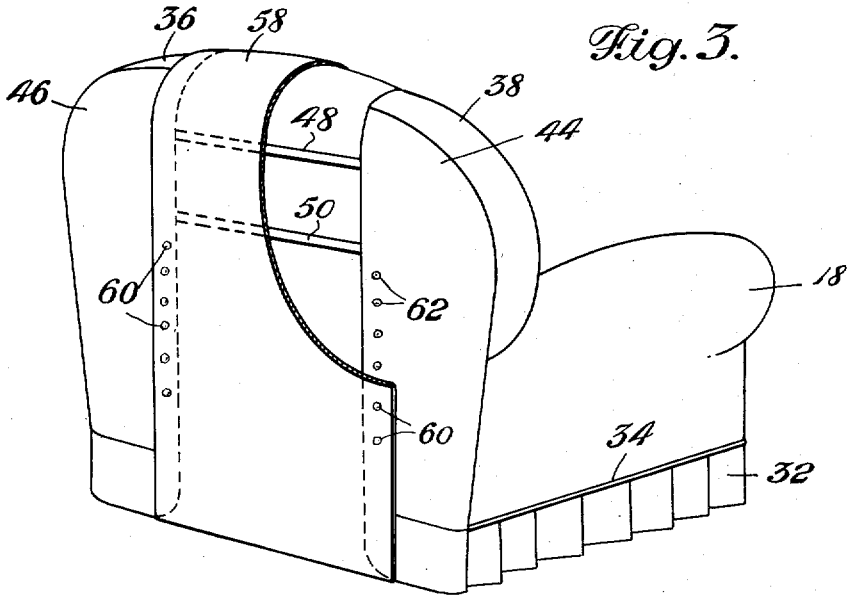
Fig. 3 is a rear and side perspective view of the slip cover illustrated in Figs. 1 and 2, with parts broken away.

Referring now to the drawings, and particularly Figs. 1–3, one form of the slip cover embodied in the present invention is illustrated and includes a seat panel 10 that extends from the back of the chair seat to the front, terminating in an overhanging portion 10*a* formed as an integral part of the seat panel 10. Joined to the seat panel 10 along the seam lines 12 and 14 are side panels 16 and 18. The side panels 16, 18 extend from the seat portion 10 at the base of the inside of the chair arms, over the upper surface of the arms, and down along the outer side of the chair. Front arm panels 20 and 22 are joined to the side panels 12 and 14, respectively, along the seam lines 24 and 26 and extend downwardly being joined at the lower end thereof to the overhanging portion 10*a* along the seam lines 28, 30. A fringe or skirt 32 extends around the lowermost portion of the chair and is joined to the overhanging portion 10*a*, side panels 12, 14 and front arm panels 16 and 18 along the seam line 34. The seam lines for the extension 10*a* of the seat portion 10, front arm panels 20, 22 and skirt 32, are provided with a raised rib that forms a decorative arrangement, as is well known in the slip cover art. The back of the slip cover is divided into individual sections and includes back shoulder panels 36 and 38 which are joined to the side panels 16 and 18, respectively. Elastic strips 40 and 42 interconnect the back shoulder panels 36, 38 and are adapted to conform the slip cover to the size and shape of the chair to be covered, as will hereinafter be described. As shown in Fig. 3, the back of the slip cover also includes back rear panels 44 and 46, which are joined to the back shoulder panels 36, 38, respectively, at the upper portion thereof and to the side panels 12, 14 along the side portion thereof. Elastic strips 48 and 50 are connected to the back rear panels 44, 46 similarly to the manner in which strips 40, 42 are joined to the shoulder panels 36, 38 and are adapted to compensate for size variations in the chair to be covered, as will be more fully described hereinafter.

Referring again to Figs. 1 and 2, the seat panel 10 has joined to the rear portion thereof a closure flap 52 which extends upwardly from the rear portion of the seat portion 10 and covers the open portion between the shoulder panels 36, 38. As shown in Fig. 1, the front closure flap 52 is also joined to the side panels 16 and 18 along the short seam lines 54, 56, respectively. Secured directly to the front closure flap 52 is a rear closure flap 58 which covers the open portion between the rear panels 44, 46 when the slip cover is in the fitted position on the chair. Snap buttons 60 are suitably secured to the rear closure flap 58 and complementary snaps 62 adapted to receive the snap buttons 60 are suitably secured to the rear panels 44, 46 adjacent the inner edge thereof. It is apparent that when the rear flap 58 is folded over the back of the chair to cover the open portion between the rear panels 44, 46, the snap buttons 60 can be engaged with the snaps 62 and thereby provide a convenient and neat method of securing the rear flap 58 in place.

In applying the slip cover to a chair of the type indicated in Figs. 1–3, the slip cover unit is first slipped over the chair with the seat panel 10 generally positioned on the chair seat and the back shoulder and rear panels stretched to fit the chair back. The front arm panels 20 and 22 are adjusted until they fall along the front of the arms of the chair. The side panels 16 and 18 are then tucked in between the sides and seat of the chair and smoothed until the proper fit along the chair arms and sides is effected. The seat panel 10 is also tucked in between the back and seat of the chair until the seat panel 10 is smoothly and tightly fitted on the seat of the chair. Enough material is provided for the seat panel 10 and the side panels 16, 18 to compensate for the larger size chairs and if a smaller chair is covered, any excess material is tucked between the sides and back and the seat of the chair. The shoulder panels 36, 38 are smoothly arranged on the back of the chair, the elastic strips 40, 42 stretching to allow for any variations in size of the chair back. Surplus material in the shoulder portions 36, 38 is tucked into the crevice between the chair back and arms until the chair back assumes a form-fitting appearance. The front and rear closure flaps 52 and 58, during the preliminary fitting steps, are in the open position as shown in the right-hand portion of Fig. 1. After the seat, sides and back of the slip cover have been form-fitted to the chair, the closure flaps 52, 58 are placed over the chair back covering the open spaces between the divided shoulder panels 36, 38 and the divided rear panels 44, 46. The surplus material at the lowermost end of the front closure flap 52 is tucked in the crevice between the chair back and seat, and the sides of the front closure flap 52 are stretched outwardly along the front of the chair back to effect a smooth fitting. The rear closure flap 58 drapes over the chair back, as seen in Fig. 3 and is secured to the rear panels 44, 46 by the snap buttons 60. The skirt 32, which is joined to the seat panel 10, front arm panels 20, 22 and side panels 16, 18 hangs loosely from the bottom thereof in the well known manner to provide a covering for the lower portion of the chair.

Figure 5:
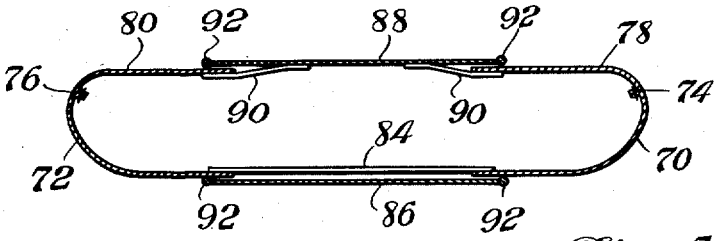
Fig. 5 is a horizontal sectional view of the modified slip cover illustrated in Fig. 4.
Figure 4:
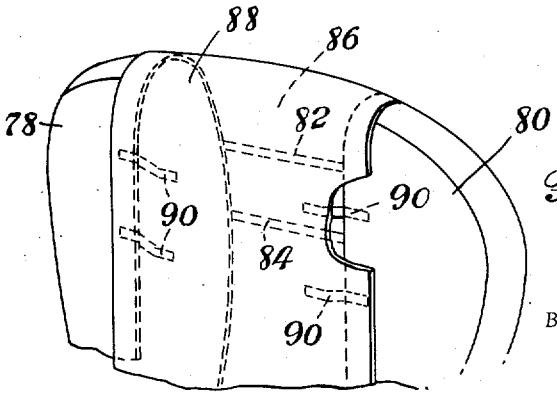
Fig. 4 is a partial rear perspective view of a modified form of a slip cover embodied in the present invention.

Referring now to Figs. 4 and 5, a modified form of the slip cover is illustrated and includes a seat panel, front panels and side panels (not shown) that are substantially the same as set forth in the slip cover described hereinabove. The modified slip cover further includes separated back shoulder panels 70 and 72 which have joined thereto along the seams 74, 76, respectively, separated back rear panels 78, 80. The shoulder panels 70, 72 are interconnected by elastic strips 82, 84 which provides for adjustment of the shoulder panels in accordance with the size of the chair to be covered. A front closure flap 86 extends upwardly along the back of the chair and covers the open portion between the shoulder panels 70, 72. Joined to the front closure flap 86 and forming an extension thereof is a rear closure flap 88 which is secured to the rear panels 78, 80 by small elastic strips 90. The elastic strips 90 are secured to the inner surface of the rear closure flap 88 along the edges thereof and to the outer surface of the rear panels 78, 80 adjacent the edges thereof. The edges of both the front and rear closure flaps are formed with raised ribs 92 which are provided for decorative purposes.

In applying the slip cover illustrated in Figs. 4 and 5, the back shoulder panels 70, 72 and back rear panels 78, 80 form a complete unit and as such are slipped over the back of the chair to be covered. The elastic strips 82, 84 connected to the shoulder panels compensate for any size variations in the chair back, while the front closure flap 86 covers the exposed portion between the divided shoulder panels 70, 72, thereby providing a neat appearing arrangement. The rear closure flap 88 covers the exposed portion between the rear panels 78, 80 and cooperates with the rear panels by means of the elastic strips 90 to compensate for any variation in the size of the chair back. Since the shoulder and rear panels are secured together as a unit with the front and rear closure flaps 86, 88, they immediately conform to the chair back when the unit is slipped thereon, thereby obviating the use of closing snaps for securing the rear closing flap 88 in place. Any excess cloth on the front side of the chair back is tucked into the crevice between the seat and the lower portion of the chair back. A form fit of the slip cover is eventually effected by pulling the rear panels 78, 80 downwardly to smooth out the back of the slip cover and then tucking in the side and seat panels as required.

From the above description, it is apparent that the slip cover embodied herein may be conveniently and simply slipped on a chair and a snug fit effected with a minimum of effort. The individual panels are provided such that enough material is available to fit a variety of size and shape chairs. Excess material is tucked away between the crevices of the back and sides and the seat. Careful measurement of the present slip cover, as applied to a piece of furniture, is obviated by the provision of the elastic strips interconnecting the shoulder panels. In the form of the invention illustrated in Figs. 1–3, the elastic strips provide for complete flexibility and the present slip cover may be made to fit a wide variety of different size and shape chairs. The closure flaps not only serve to cover the open space between the shoulder and rear panels, but can be stretched and pulled to effect a tight and snug fit of the slip cover on the chair back. The modification shown in Figs. 4 and 5 obviates the necessity of employing closing snaps, but still provides the elastic means necessary to compensate for size and shape variations in the furniture to be covered.

It will be obvious to those skilled in the are that various changes may be made without departing from the spirit of the invention and, therefore, the invention is not limited to what is shown in the drawings and described in the specification, but only as indicated in the appended claims.

What is claimed is:

1. In a slip cover for furniture, a seat panel, side panels joined to said seat panel, back panels interconnected to said seat panel by said side panels and defining open portions along the front and rear of the furniture back, closure means extending over the back of said furniture and closing said open portions, said closure means comprising a front and rear closing flap, resilient means interconnecting the back panels at the front of said furniture back, and additional resilient means secured to said back panels at the rear of the furniture back, said additional resilient means also being secured to said rear closing flap, said resilient means providing for adjustment of said back panels when said slip cover is applied to the furniture to be covered.

2. In a slip cover for furniture, a seat panel, side panels including an inner and outer portion, said inner portion being joined to said seat panel, and said outer portion being joined to back panels, said back panels interconnected to said seat panel by said side panels and defining open portions along the front and rear of the furniture back, closure means secured to said seat panel and extending over the back of said furniture thereby closing said open portions, resilient means interconnecting the back panels along the front of the furniture back, and additional resilient means secured to said back panels along the rear of the furniture back and to said closure means, said resilient means providing for adjustment of said back panels when said slip cover is applied to the furniture to be covered.

References Cited in the file of this patent or the original patent

UNITED STATES PATENTS

| | | |
|---|---|---|
| 2,100,868 | Oppenheimer | Nov. 30, 1937 |
| 2,123,667 | Trubitz | July 12, 1938 |
| 2,179,805 | Trubitz | Nov. 14, 1939 |
| 2,349,193 | Pass | May 16, 1944 |
| 2,469,520 | Roberts | May 10, 1949 |
| 2,469,876 | Gould | May 10, 1949 |
| 2,556,926 | Krasnov et al. | June 12, 1951 |
| 2,588,940 | Slossberg | Mar. 11, 1952 |
| 2,667,211 | Krasnov et al. | Jan. 26, 1954 |